Figure 1:
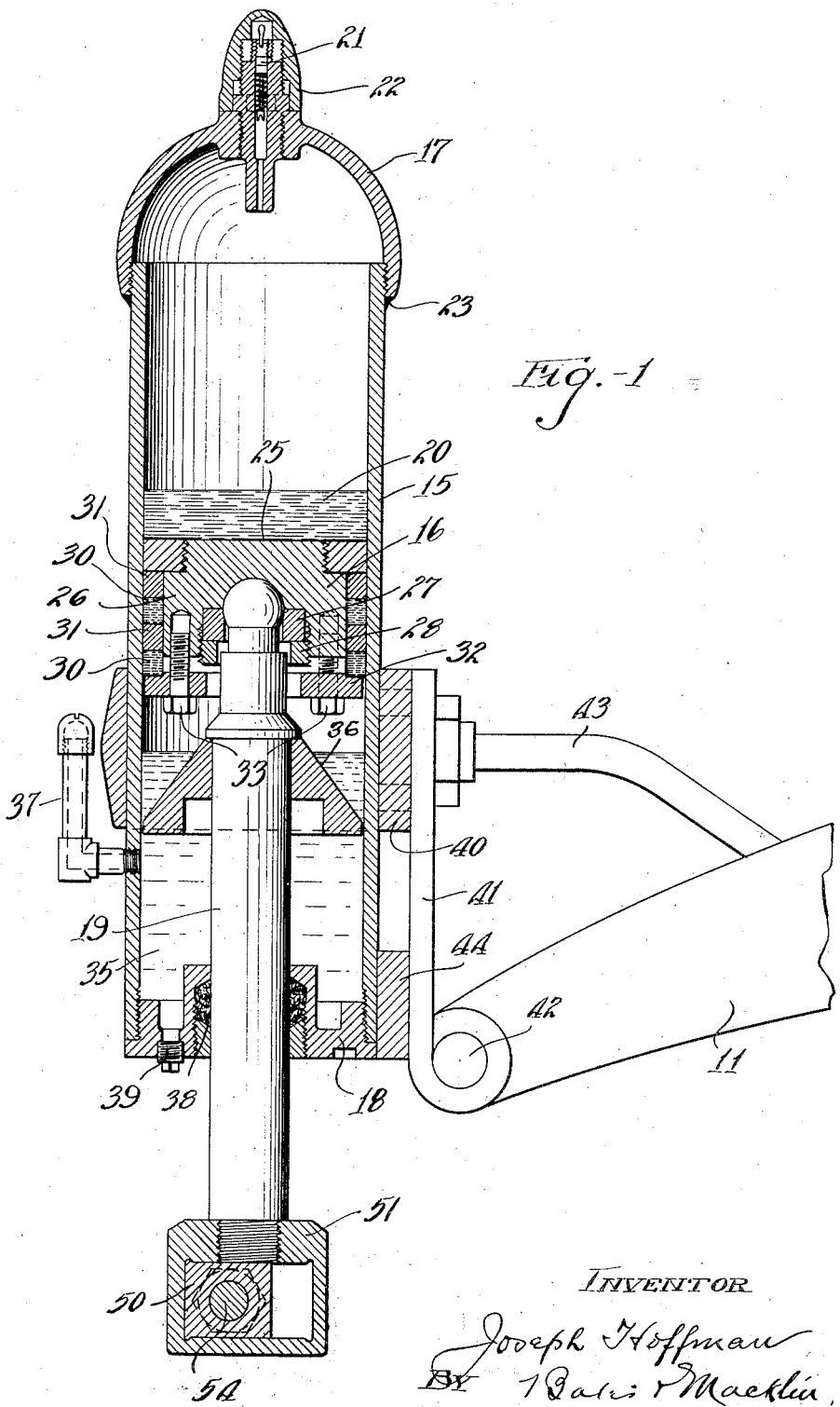

May 12, 1925.

J. HOFFMAN

SHOCK ABSORBER

Filed June 2, 1923

1,537,301

2 Sheets-Sheet 1

INVENTOR
Joseph Hoffman
BY Bates & Macklin
ATTYS.

May 12, 1925.
J. HOFFMAN
SHOCK ABSORBER
Filed June 2, 1923
1,537,301
2 Sheets-Sheet 2
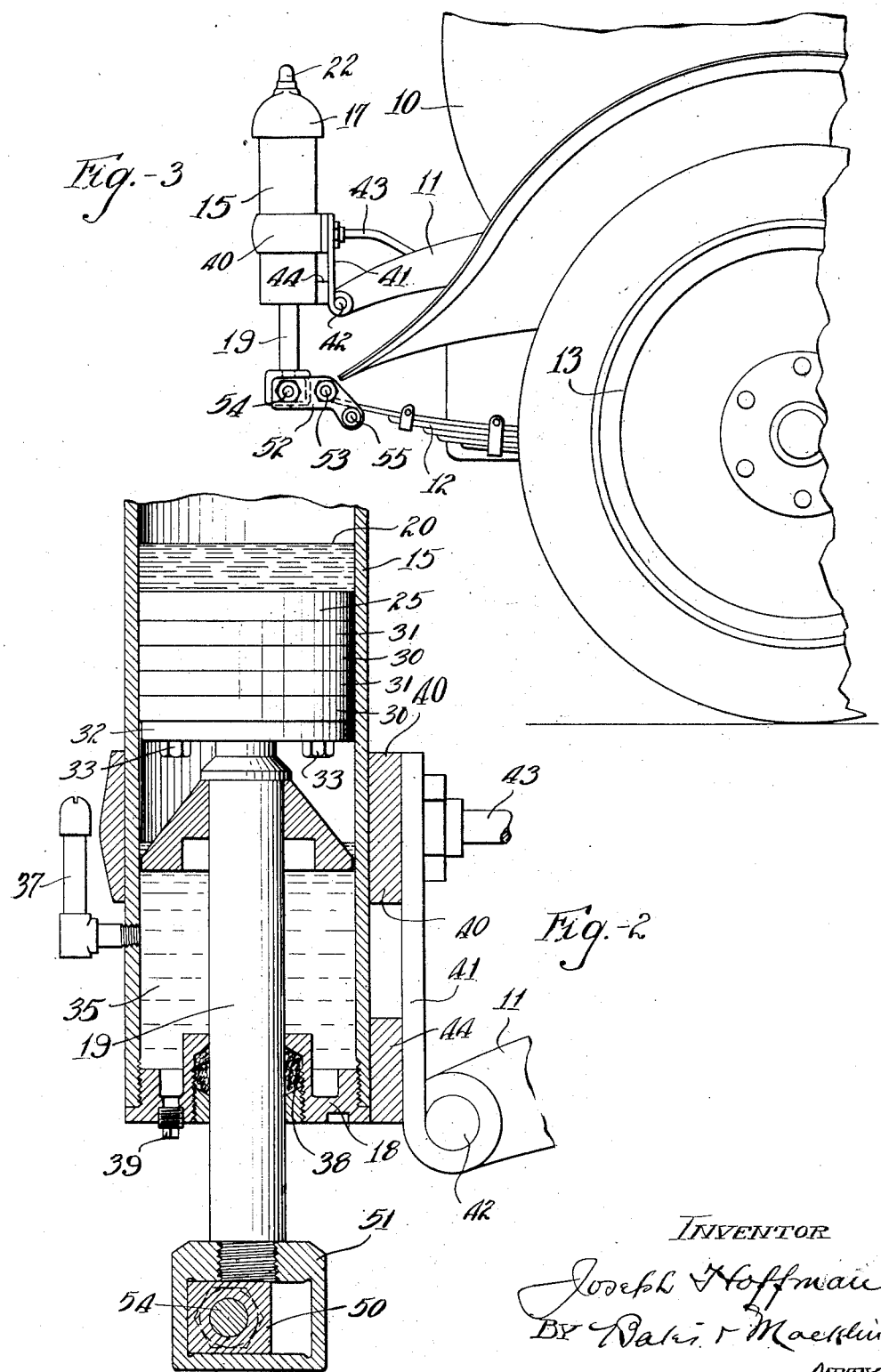
INVENTOR
Joseph Hoffman
BY Baker & Macklin,
ATTYS.

Patented May 12, 1925.

1,537,301

UNITED STATES PATENT OFFICE.

JOSEPH HOFFMAN, OF CLEVELAND, OHIO.

SHOCK ABSORBER.

Application filed June 2, 1923. Serial No. 643,077.

*To all whom it may concern:*

Be it known that I, JOSEPH HOFFMAN, a citizen of the United States, residing at Cleveland, in the county of Cuyahoga and State of Ohio, have invented a certain new and useful Improvement in Shock Absorbers, of which the following is a full, clear, and exact description, reference being had to the accompanying drawings.

This invention relates particularly to shock absorbers which are adapted for use on motor vehicles, and has for one of its objects the provision of a device wherein the pressure of a compressible fluid is varied by vertical movement of the vehicle spring due to unevenness of the road over which the vehicle is traveling.

Shock absorbers of the above type usually require about 200 pounds pressure per square inch in the air chamber which necessitates a heavy construction to withstand the pressure. A disadvantage of a device requiring this pressure is the difficulty of replenishing the pressure since the ordinary tire pump is incapable of producing the desired pressure.

My invention contemplates a simple compact structure which has few working parts, and which is readily accessible for replenishing the lubricant without necessitating the removal of the device from the vehicle, and for maintaining the fluid pressure at the proper degree of means of a manually operated tire pump.

Another object of my invention is the provision of a device which may be quickly attached to existing motor vehicles without necessitating extensive changes or modifications in the construction thereof.

The means for carrying out my invention will hereinafter be set forth in the following description which pertains to the accompanying drawings. The essential features will be summarized in the claims.

In the drawings, Fig. 1 is a vertical section taken through a shock absorber embodying my invention; Fig. 2 is a section showing a portion of the device and illustrating a different position of the piston from that shown in Fig. 1; and Fig. 3 is an elevation of the device attached to a motor vehicle.

My invention is particularly adapted for use on a motor vehicle and accordingly I have illustrated a vehicle 10 as having a frame extension which constitutes a vehicle section 11, a spring section 12, and wheel 13. The shock absorber is adapted to constitute the connection between the frame and spring. My invention is illustrated as having a relatively stationary member 15, which is carried by the frame 11, and as having a relatively movable member or piston 16, the outer end of which is adapted to be operatively connected to the spring section 12. The pressure exerted by the spring upon the movable member is counterbalanced by the pressure of a compressible fluid within the member 15, and above the piston 16, while the return of the piston is controlled by the passage of a baffle through a non-compressible fluid as will be hereinafter described.

The relatively stationary member 15 comprises a cylinder having a closure 17 at one end thereof and a closure 18 at the opposite end thereof. The piston 16 is mounted on the piston rod 19 and is reciprocable within the casing 15 and forms a fluid tight connection therewith. The space above the piston is filled preferably with air under pressure to counteract the upward thrust exerted by the spring on the piston rod 19. A layer of lubricant 20, above the piston serves to provide lubrication between the piston and the cylinder.

Air may be pumped into the cylinder through a valve 21 which may be similar to the usual tire valve and may be protected by a dust cap 22. The closure 17 is preferably threaded to engage a correspondingly threaded portion on the outer wall of the cylinder. The end of the closure may then be sealed to the cylinder, as by brazing at 23.

The piston preferably comprises a disc-like plate 25 which is threaded to receive a core 26 which in turn is provided with a socket to receive the piston. The core is smaller in diameter than the plate 25, so as to provide sufficient space for packing rings. The core is also provided with a recess beneath the socket to receive a split ring 27, and a follower 28 which serves to retain the piston rod in adjusted position with relation to the piston. To prevent leakage past the piston, I may provide separated packing rings 30 which extend between the core and walls of the cylinder and are positioned by spacing rings 31. A suitable retaining plate 32 may be adjustably connected to the piston, as by securing members 33, for adjusting the packing.

The air pressure in the upper chamber counteracts the pressure exerted by the action of the spring while the vehicle is in motion. That is, an upward movement of the wheels relative to the frame compresses the air in the upper chamber and thus destroys the equilibrium of pressure. Thereupon the piston is forced downwardly until the pressure within the upper chamber is again equal to that exerted upon the piston rod by the spring.

To cushion the downward movement of the piston, I provide a non-compressible fluid, such as a liquid, as at 35, within the lower chamber and I employ a baffle 36 which is carried by the piston rod and is adapted to pass through the liquid when the piston is moved. The baffle preferably comprises a conical section having the inclined surface facing upwardly and having the base of less diameter than the cylinder. Normally, the level of liquid within the lower chamber is above the base of the cone as illustrated in Fig. 1, wherefore the level of the liquid is lowered as the piston is raised within the cylinder. The inclined surface of the member 36, being on the upper side thereof, permits the liquid to pass easily between the member and the walls of the cylinder, while the piston is moving upwardly. On the downward movement, however, the flat base of the member 36 resists the passage of the piston rod through the liquid whereupon the piston may descend only as quickly as the seepage of liquid between the member 36 and the walls of the cylinder will permit.

The liquid 35 may be maintained at a predetermined level through an exterior conduit 37 which is attached to the side of the cylinder beneath the normal liquid level. The liquid may thus be maintained within the cylinder under atmospheric pressure.

To retain the liquid 35 within the chamber therefor, I may provide a stuffing box 38 adjacent the closure 18 and piston rod 19. A suitable plug 39 may be attached to the closure for permitting the liquid to be drained when desired.

The preferred manner of connecting the device to the frame is illustrated as a band 40 which surrounds the cylinder and is rigidly attached thereto. A bracket 41 may be connected at one end, as at 42, to the frame extension 11, and a strut 43 extends between the upper end of the bracket and the frame as illustrated in Fig. 3. The bracket 41 may have a guide block 44, carried thereby, and disposed on the side adjacent the cylinder to strengthen the connection between the cylinder and bracket.

To connect the piston rod to the spring, I have illustrated a lost motion connection which permits flexing of the spring without placing undue strain upon the piston rod. This mechanism is illustrated as a block 50 which lies within a head 51, which in turn is carried at the outer end of the piston rod.

To connect the block to the frame, I have illustrated a member 52 which is attached intermediately, as at 53, to the spring and is connected at one end to the block as at 54. The opposite end of the member 52 preferably extends downwardly beneath the top leaf of the spring and has a transverse through bolt 55, which engages the under side of the top piece as illustrated in Fig. 3.

Assuming that a shock absorber, constructed according to my invention, is attached to a motor vehicle as heretofore described, then the chamber above the piston is filled with air under pressure through the valve 21 until the pressure therein is sufficient to withstand the normal load on the vehicle wheel. Under these conditions, the liquid or oil within the lower chamber is sufficient so that the level thereof is above the base of the member 36, as illustrated in Fig. 1. When the vehicle is in motion, and the wheel adjacent the shock absorber strikes an obstruction in the roadway, then the piston is forced upwardly, thereby increasing the air pressure in the chamber above the piston, and lowering the level of liquid in the lower chamber. As soon as the wheel has passed the obstruction, then the increased pressure in the upper chamber forces the piston downwardly while the liquid in the lower chamber prevents rapid downward movement of the piston.

In view of the foregoing description, it will be seen that my invention provides a shock absorber which employs a fluid under pressure for a cushioning medium, and which has few movable parts. Moreover, my invention is so constructed that the cushioning medium may be readily maintained at the proper pressure and at the proper level without necessitating the removal thereof from the vehicle. A further advantage of a shock absorber constructed in accordance with my invention is that the absorber may be readily connected to existing vehicles without necessitating extensive changes in the construction thereof.

I claim:

1. A shock absorber having, in combination, a relatively stationary member comprising a housing, a relatively movable member within said housing, said housing having a pressure chamber on one side of the movable member and having a reservoir on the other side of the movable member, a liquid in said reservoir and a baffle rigid on the movable member and inwardly tapered on the side toward the pressure chamber for enabling said member to be more readily moved in that direction than in the opposite direction, said member being yieldably opposed by the liquid when moved in such opposite direction.

2. The combination with a pair of vehicle sections, of a housing carried by one of said sections, a member movable within the housing and operatively connected to the other of said sections, said housing being closed at each end to provide chambers on opposite sides of the movable member, a compressible fluid in one of said chambers, said fluid having a pre-arranged pressure sufficient to balance the load on said sections, and a non-compressible fluid in the other of said chambers, and a baffle rigid on the movable member and conical on the side toward the pressure chamber and substantially flat on the opposite side for enabling the non-compressible fluid to oppose movement of the baffle more effectively in one direction than in the other.

3. In combination, a pair of vehicle sections, a cylinder on one of said sections, a piston operatively connected to the other of said sections, a member movable with the piston, and a liquid within the cylinder surrounding the piston rod and also surrounding said member, and said member being so arranged that movement thereof through the liquid is restricted to a greater degree when the piston is moved in one direction than when the piston is moved in the opposite direction.

4. In a device of the class described, the combination with a cylinder, of a piston movable therein, a piston rod, a conical baffle mounted on said rod, a liquid disposed within the cylinder in the region of said baffle, said liquid enclosing at least a part of said baffle, and said baffle being so arranged that movement of the piston in one direction is restricted to a greater degree by said liquid than movement of said piston in the opposite direction.

5. In combination with the chassis frame of a motor vehicle, of a spring section cooperating with said frame, a cylinder rigidly connected to the frame, a piston movable within said cylinder, a piston rod projecting through the cylinder, means for providing a lost motion connection between the free end of said rod and said section, a ball and socket connection between the piston rod and said piston, means adjacent the top of the cylinder for enabling air under pressure to be injected into the cylinder above the piston, means adjacent the opposite end of the cylinder for enabling liquid to be injected into the cylinder beneath the piston, a baffle carried by the piston rod, the baffle being beneath the level of said liquid and having a restricted passageway therethrough whereby the liquid permits the piston to be moved faster in one direction than in the opposite direction.

6. In a device of the class described, the combination with an upright cylinder of a piston movable therein, means for injecting air under pressure into the cylinder above the piston, means for enabling liquid to be injected into the cylinder beneath the piston, a piston rod projecting through the liquid and beyond the cylinder, a member spaced from the piston and rigidly connected to the piston rod, said member having at least a portion thereof disposed beneath the level of said liquid and providing a passageway whereby the liquid may flow downwardly when the piston is raised, and is forced upwardly when the piston is lowered.

7. In a device of the class described, the combination with an upright cylinder of a piston therein, an air valve at the top of the cylinder, a closure therefor, a piston rod operatively connected to the piston and projecting through the bottom of the cylinder, means for enabling a liquid to be injected into the cylinder beneath said piston, a conical baffle carried by the piston rod beneath the piston, the inclined surface of said baffle facing upwardly and being partly immersed within said liquid, said baffle also having a diameter less than that of the cylinder whereby liquid may flow past the baffle when the piston is moved in either direction, means for connecting the cylinder to one spring section, and means for operatively connecting the piston rod to another spring section.

In testimony whereof, I hereunto affix my signature.

JOSEPH HOFFMAN.